United States Patent [19]
Ball

[11] Patent Number: 6,020,986
[45] Date of Patent: Feb. 1, 2000

[54] PROGRAMMABLE ADD-DROP MODULE FOR USE IN AN OPTICAL CIRCUIT

[75] Inventor: Gary A. Ball, Simsbury, Conn.

[73] Assignee: JDS Uniphase Corporation, San Jose, Calif.

[21] Appl. No.: 08/976,307

[22] Filed: Nov. 21, 1997

[51] Int. Cl.$^7$ .................................................. H04J 14/02
[52] U.S. Cl. ........................ 359/130; 359/128; 359/124; 385/37; 385/24
[58] Field of Search .................................. 359/124, 130, 359/127, 128; 385/24, 37

[56] References Cited

U.S. PATENT DOCUMENTS

| | | | |
|---|---|---|---|
| 4,284,663 | 8/1981 | Carruthers et al. | 427/164 |
| 4,782,491 | 11/1988 | Snitzer | 372/6 |
| 4,815,079 | 3/1989 | Snitzer et al. | 372/6 |
| 4,953,939 | 9/1990 | Epworth et al. | 350/96.19 |
| 4,984,861 | 1/1991 | Suchoski, Jr. et al. | 350/96.11 |
| 5,026,137 | 6/1991 | Tokumitsu | 350/96.16 |
| 5,107,360 | 4/1992 | Huber | 359/124 |
| 5,115,338 | 5/1992 | DiGiovanni et al. | 359/337 |
| 5,119,447 | 6/1992 | Trisno | 385/3 |
| 5,134,620 | 7/1992 | Huber | 372/6 |
| 5,140,456 | 8/1992 | Huber | 359/341 |
| 5,148,503 | 9/1992 | Skeie | 385/3 |
| 5,151,908 | 9/1992 | Huber | 372/6 |
| 5,153,762 | 10/1992 | Huber | 359/125 |
| 5,159,601 | 10/1992 | Huber | 372/6 |
| 5,166,821 | 11/1992 | Huber | 359/238 |
| 5,168,534 | 12/1992 | McBrien et al. | 385/3 |
| 5,187,760 | 2/1993 | Huber | 385/37 |
| 5,191,586 | 3/1993 | Huber | 372/6 |
| 5,200,964 | 4/1993 | Huber | 372/26 |
| 5,208,819 | 5/1993 | Huber | 372/32 |
| 5,210,631 | 5/1993 | Huber et al. | 359/132 |
| 5,210,633 | 5/1993 | Trisno | 359/194 |
| 5,222,089 | 6/1993 | Huber | 372/26 |
| 5,231,529 | 7/1993 | Kaede | 359/124 |
| 5,243,609 | 9/1993 | Huber | 372/19 |
| 5,257,124 | 10/1993 | Glaab et al. | 359/124 |
| 5,257,125 | 10/1993 | Maeda | 359/196 |
| 5,260,823 | 11/1993 | Payne et al. | 359/341 |
| 5,268,910 | 12/1993 | Huber | 372/6 |
| 5,271,024 | 12/1993 | Huber | 372/6 |
| 5,283,686 | 2/1994 | Huber | 359/337 |
| 5,579,143 | 11/1996 | Huber | 359/130 |
| 5,608,825 | 3/1997 | Ip | 385/24 |
| 5,627,848 | 5/1997 | Fermann et al. | 372/18 |
| 5,633,748 | 5/1997 | Perez et al. | 359/325 |
| 5,636,301 | 6/1997 | O'Sullivan et al. | 385/24 |
| 5,638,473 | 6/1997 | Byron | 385/37 |
| 5,726,785 | 3/1998 | Chawki et al. | 359/130 |

FOREIGN PATENT DOCUMENTS

| | | |
|---|---|---|
| 0 730 172 A1 | 9/1996 | European Pat. Off. . |
| 0 794 629 A2 | 9/1997 | European Pat. Off. . |
| 2 295 247 | 5/1996 | United Kingdom . |
| WO 96/19884 | 6/1996 | WIPO . |

OTHER PUBLICATIONS

"Fiber—Amplifier Cascades with Gain Equalization in Multiwavelength Unidirectional Inter–Office Ring Networks" by A.F. Elrefaie, E.L. Goldstein, S. Zaidi, and N. Jackman, *IEEE Photonics Technology Letters*, vol. 5, No. 9, Sep. 1993.

"Ytterbium–Doped Fiber Amplifiers" by Rüdiger Paschotta, Johan Nilsson, Anne C. Trooper and David C. Hanna, *IEEE Journal of Quantum Electronics*, vol. 33, No. 7, Jul. 1997.

*Primary Examiner*—Kinfe-Michael Negash
*Attorney, Agent, or Firm*—McCormick, Paulding & Huber LLP

[57] ABSTRACT

An apparatus for use in selectively adding or dropping channels in an optical network includes an optical circulator and an array of programmable fiber Bragg gratings. Each fiber Bragg grating is a narrow ban reflective element which can be tuned on or off of an ITU standard wavelength division multiplex channel so that the channel is either fully reflected or transmitted by the grating. The addition or subtraction of signal channels is operated by a controller which operates the individual fiber Bragg gratings between transmissive and reflective states.

6 Claims, 4 Drawing Sheets

PROGRAMMABLE ADD-DROP MODULE FOR USE IN AN OPTICAL CIRCUIT

FIELD OF THE INVENTION

This invention relates generally to communication circuits, and more particularly to a module for selectively adding or dropping signal channels in a long distance optical communication network.

CROSS REFERENCE TO RELATED APPLICATIONS

Some of the matter contained herein is disclosed and claimed in the commonly owned U.S. patent application Ser. No. 08/885,428, entitled "Process For Fabrication And Independent Tuning Of Multiple Integrated Optical Directional Couplers On A Single Substrate" (Attorney Docket No. 4827-09); U.S. patent application Ser. No. 08/885,449, entitled "Method and Apparatus For Dynamically Equalizing Gain In An Optical Network" (Attorney Docket No. 4827-11) and U.S. patent application Ser. No. 08/885,427, entitled "Loop Status Monitor For Determining The Amplitude Of The Signal Components Of A Multi-Wavelength Optical Beam" (Attorney Docket No. 4827-13) all of which are incorporated herein by reference.

BACKGROUND OF THE INVENTION

Wavelength division multiplexing (WDM) of optical beams is presently being used to increase the rate of transmission of information through an optical fiber. These multi-wavelength optical beams provide information by a plurality of signal components, also referred to as optical channels. Each channel is defined by a unique wavelength of light. These beams are multiplexed together and transmitted through a communication link of an optical network. The optical beam comprises the main signal transmission carrier (or "line" in electrical parlance).

Present day telecommunication systems are point to point systems where capacity can be increased by just an increase in the bit rate. Wavelength division multiplex systems (WDM) in which a number of signals propagate through a single fiber allow the increase of capacity of the single fiber or the total bit rate by adding different colors of light (channels). With links presently in service, signals are added only at the beginning of the link. It would be desirable to dynamically reconfigure the bandwidth of a network to meet customer demand by re routing of channels as needed.

Mechanical switches and silica-on-silicon waveguides using thermal switching have been developed for use in dynamically reconfiguring signal channels, but suffer from their broadband nature. Arrays of these switches can be combined with traditional demultiplexers and multiplexers to form a wavelength selective add/drop moduler for WDM links. This solution is unattractive from both performance and cost standpoints. Alternate electro-optic solution, such as an AOTF switches, are highly desirable, however, the required devices are not presently available. To date, suitable add/drop devices simply do not yet exist.

It would be desirable to have a wavelength division multiplex optical network with an apparatus capable of adding and/or dropping signal channels so that the network is dynamically reconfigurable. The present invention is drawn toward such a network and apparatus.

SUMMARY OF THE INVENTION

An object of the present invention is to provide an optical network that can be reconfigured during operation without a halt in service.

It is another object of this invention to provide an optical add/drop module that can be inserted into an optical network to allow for dynamic reconfiguration It is a further object of this invention to provide an optical switch for use in optical networks that can switch two input signals between two output signal channels Another object of the present invention is to provide an apparatus of the foregoing type that has an array of tunable fiber Bragg gratings and a 3 port circulator which can be upgraded while in the field.

Still another object of the present invention is to provide a network of the foregoing type in which signal cross talk between outputs can be selectively reduced.

According to the present invention, an add/drop apparatus for use in selecting component signals of a multi-wavelength optical beam transiting an optical network in which each component signal has an amplitude and a unique wavelength, the apparatus includes a circulator for receiving said optical beam at an entry port and combining said optical beam with a supplemental optical beam received at a second port for presenting an augmented optical beam to an exit port; a plurality of optical switches for presenting, in response to control signals, a selected one of the component signals to the supplemental optical beam; and a controller for generating said optical switch control signals.

According to another aspect of the present invention, a 2×2 optical switch for providing first and second optical output signals from either a first or second input optical signals, with each of the optical signals having component signals with an amplitude and a unique wavelength includes a first circulator for receiving the first input optical beam at an entry port and for presenting a first output optical beam to first and second first circulator exit ports. There is a second circulator for receiving the second input optical beam at an entry port and for presenting a second output optical beam to first and second circulator exit ports. Also included is an array of fiber Bragg grating for reflecting or transmitting the first and second optical signals in response to optical control signals. A controller generates the optical control signals to switch the fiber Bragg grating array between transmissive and reflective states.

According to still an other aspect of the present invention an optical switch providing enhanced signal channel separation of component signals of a multi-wavelength optical beam transiting an optical network in which each component signal has an amplitude and a unique wavelength has an optical circulator for receiving said optical beam at a first port and for combining the optical beam with a supplemental optical beam received at an optical circulator second port. The optical circulator presents an augmented optical beam to an optical circulator exit port. There is a first array of fiber Bragg gratings positioned in optical communication with the optical circulator second port for reflecting or transmitting the optical beam in response to optical control signals. An optical isolator transmits an optical signal presented from the first fiber Bragg grating received at an optical isolator inlet port and reflects an optical signal received at an optical isolator exit port. The optical switch also has a second array of fiber Bragg gratings for reflecting or transmitting an optical beam received from said optical isolator exit port in response to optical control signals. A controller generates the optical control signals to switch selected ones of said fiber Bragg gratings between transmissive and reflective states.

According to still another aspect of the present invention, an optical network having a main line and a branch line includes a plurality of optical signal generators each providing an optical beam having a unique amplitude and wavelength. There is a multiplexor for receiving said optical beams and for providing to the main line a multi-wavelength optical beam with a plurality of component signals each of which corresponds to one of the optical beams. There is also an optical amplifier for receiving and providing amplification to the multi-wavelength optical beam. An add/drop apparatus receives the multi-wavelength optical beam and selectively communicates one of the component signals with the branch line, the add/drop apparatus includes a circulator for receiving the optical beam at an entry port and combining the optical beam with a supplemental optical beam received at a second port for presenting an augmented optical beam to an exit port. There is an array of fiber Bragg gratings in communication with the circulator second port, each of the fiber Bragg gratings tuned to a respective one of the component signal wavelengths. The plurality of fiber Bragg gratings present, in response to control signals, a selected one of the component signals to the supplemental optical beam. There is also a controller for generating the optical control signals to switch selected ones of the fiber Bragg gratings between transmissive and reflective states. A demultiplexor receives and demultiplexes the multi-wavelength optical beam into the plurality of component signals. There is a detector array having a plurality of photodetectors for receiving the component signal beams and for providing a corresponding electrical feedback signal for each of the component signals indicative of the magnitude of the output power of the component signal.

The above and other objects and advantages of this invention will become more readily apparent when the following description is read in conjunction with the accompanying drawings.

DETAILED DESCRIPTION OF THE PREFERRED EMBODIMENT

Figure 1:
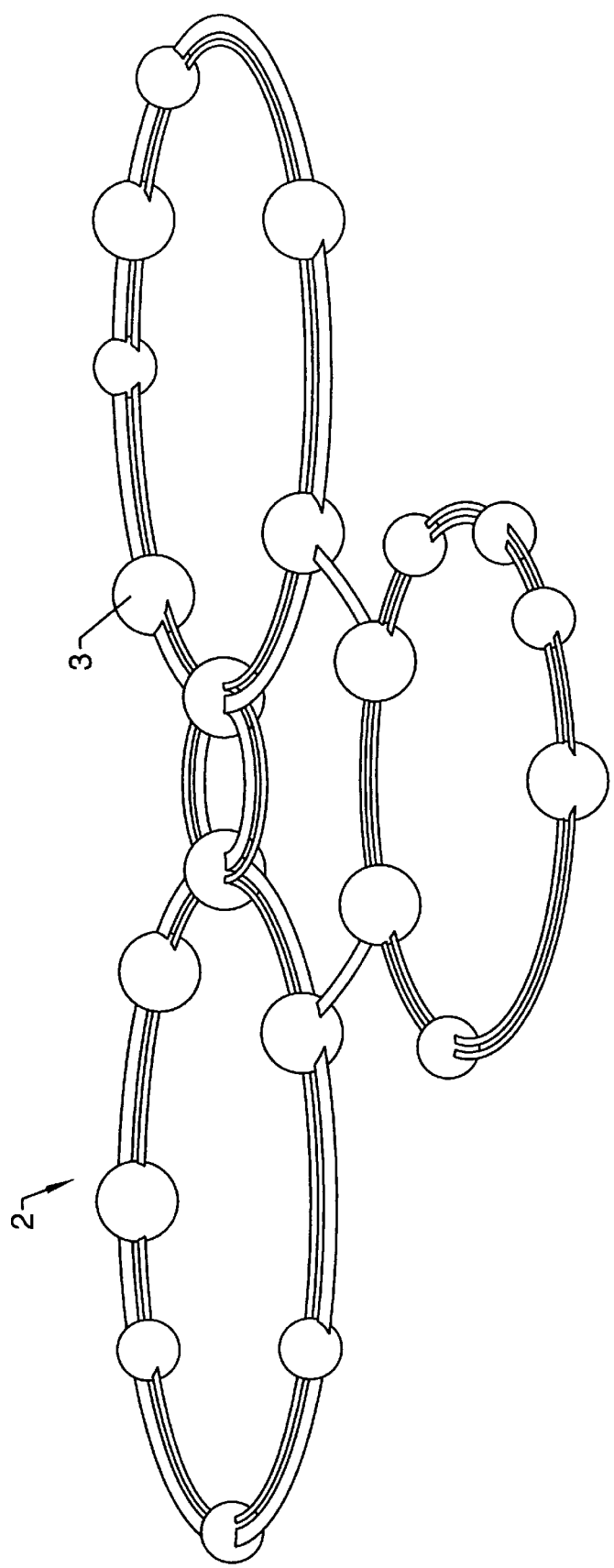
FIG. 1 is a graphical representation of an optical network of the present type.
Figure 2:
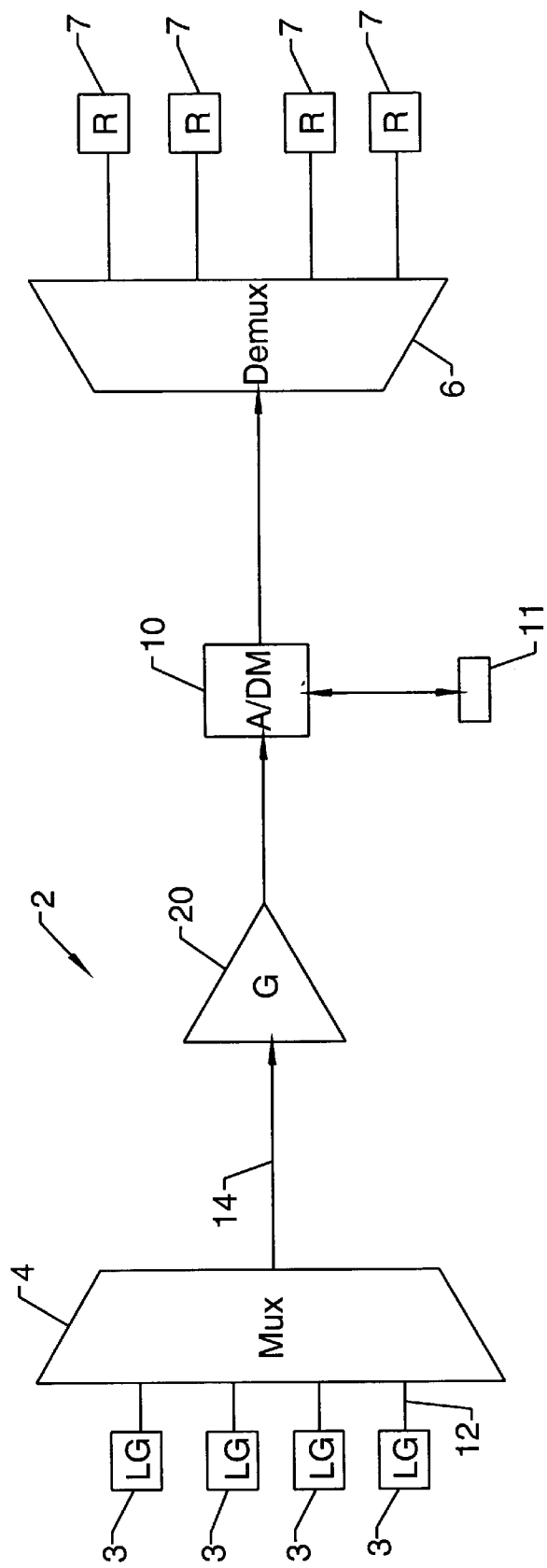
FIG. 2 is a simplified schematic illustration of a portion of the optical network of FIG. 1.

Referring to both FIGS. 1 and 2 there is shown a graphical representation of a typical communication link 2. The link is used in communicating over long distances between cities and respective outlying areas schematically indicated by nodes 3. Within the network there a plurality of optical signal generators 3 to provide respective component signals 12 of select wavelengths that each define a signal channel. These component signals are combined by a multiplexor 4 to produce a multi-wavelength optical beam 14. A corresponding plurality of amplifiers 20 amplify the optical beam 14 to compensate for fiber loss as the beam passes therethrough. The optical beam 14 comprises the main signal transmission carrier (or "main line").

At the receiver end of the communication link, the signal components of the optical beam are then separated by a demultiplexor 6 and provided to a corresponding receiver (R) 7. Also seen in FIG. 2 is a simplified representation of an add/drop module 10 provided in accordance with the present invention which can selectively add or drop signal channels indicated schematically at 11.

Figure 3:
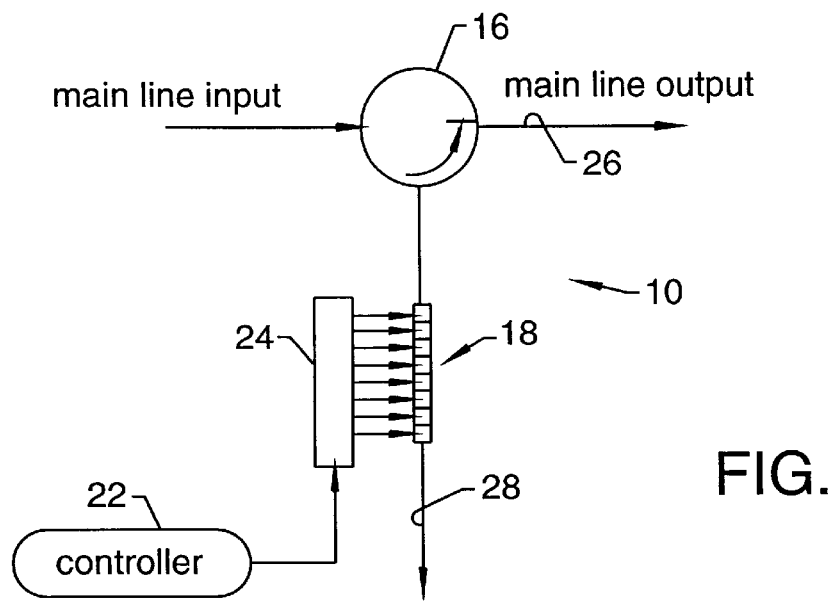
FIG. 3 is a graphical representation of an add/drop module as provided by the present invention.

As shown in FIG. 3, the add-drop module 10 is seen to be both unidirectional and programmable. It is an efficient 3-port module which preferably incorporates a circulator 16 and an array 18 of tunable fiber Bragg gratings. Each fiber Bragg grating is a narrow-band reflective element which can be tuned on or off of an ITU standard WDM channel so that the channel is either fully reflected or transmitted by the grating. The fiber Bragg gratings used by the present invention are of a tape known in the are such as disclosed in U.S. Pat. No. 5,077,816 incorporated herein by reference. The gratings and tuning ranges are designed so that they do not interfere with each other.

Fiber Bragg gratings are notch bandstop filters which substantially reflect received signals within a range of wavelengths and which pass substantially unattenuated those signals which are not within the range of wavelengths. Ideally, the wavelengths of the component signals and the reflection characteristics of the fiber Bragg gratings are such that each filter reflects at most one component signal, and passes the remaining component signals substantially unattenuated. Accordingly, there should be one filter for each possible channel in the multi-wavelength signal.

When a fiber Bragg grating is reflective at it's nominal ITU wavelength, its corresponding channel on the main line input will be transmitted to the main line output. When that grating is transmissive at its nominal ITU wavelength, the corresponding channel will be dropped. That channel is now free, and can be subsequently added onto the main line output.

An advantage of the present invention is that the add/drop module can be upgraded, by adding additional tunable fiber Bragg gratings at additional ITU wavelengths without the need to halt operation of the main signal transmission line. This continuous operation upgradability is necessary in many communications architectures.

Also shown in FIG. 3 is a controller 22 that selectively enables the operation of the fiber Bragg gratings. The controller is of a known type and presents control signals to operate each of the fiber Bragg gratings to selectively block or pass channels to or from the main line. The fiber Bragg gratings may be actuated between transmissive and reflective modes in a number of ways. In a first embodiment, the fiber Bragg gratings employ strain-tuning in which the wavelengths vary with the physical stress applied to each grating. Typically, the wavelength of the grating is adjusted ("tuned") by 1.2 nm per me of strain for gratings having a wavelength of approximately 1540 nm. Strain is preferably applied by coupling at least one actuator such as a piezo-electric device to each fiber Bragg grating, and adjusting the current applied to each piezo-electric device from the controller. In FIG. 3, the piezo-electric devices are indicated collectively at 24. Table 1 below illustrates the effects of different amounts of strain on a fiber Bragg grating having a wavelength of 1540 nm.

TABLE 1

| Pressure (kpsi) | Strain (%) | Tuning (nm) |
| --- | --- | --- |
| 5 | 0.05 | 0.6 |
| 10 | 0.10 | 1.2 |
| 25 | 0.25 | 3.0 |

The strain required to tune the grating in and out of the respective ITU channel is very small, with a strain of approximately 0.05% required to achieve the required tuning range. With current Bragg grating manufacturing technology this low level of strain can be achieved with high reliability.

The fiber Bragg gratings may also be of the type which are thermally tuned such that the wavelengths vary with the temperature of each grating. Typically, the wavelength is tuned by 0.011 nm per degree Centigrade in fiber Bragg gratings having a center wavelength of approximately 1550 nm. The temperature of each grating can be adjusted by applying an electrically-resistive coating (not shown) to or near each grating, and varying the current applied to each electrically-resistive coating from controller.

The preferred optical circulator partially circulates received optical signals. A signal (or beam) received at a port is presented to the next port in the circulator. The signal present to a port can be one received from a remote location on the line communicating with that port or one presented to the line by the circulator and reflected back. The received input optical beam from the main line is presented to a subsequent port on the circulator (up to the exit port in certain configurations), but not back to its port of origin.

A supplemental beam presented by the fiber Bragg gratings which have been actuated to the transmissive state by signals from the controller are combined with the input optical beam and presented to the exit port. Note that the remaining fiber Bragg gratings can be tuned to reflect the corresponding component signals to which they have been tuned.

It is preferable that the entire array be operated between reflective and transmissive states. In that way the module can operate to switch an input signal between two output ports. When the controller configures the array to be in the reflective mode, the input optical signal is presented at output port 26. When the controller configures the array to be in the transmissive mode, the input optical signal is presented at output port 28.

Those skilled in the art will note that the optical circulator can have more than 3 ports and is otherwise adapted to the particular application. The optical beam received at each port may be presented from fiber Bragg grating of the present type or other optical components on the network.

Figure 4:
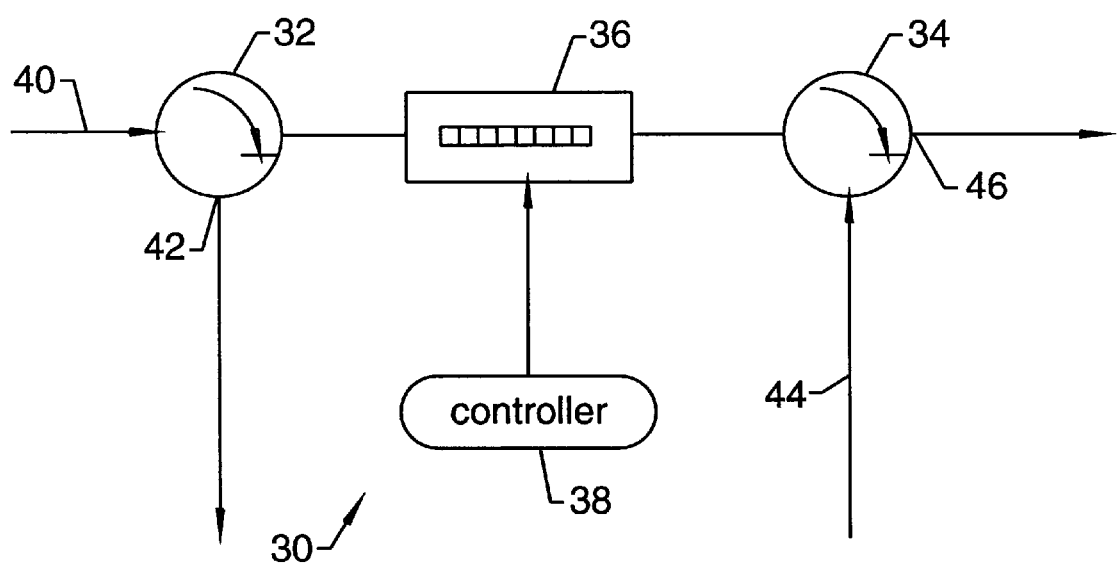
FIG. 4 is a graphical representation of a 2×2 optical switch provided by the present invention.

FIG. 4 is a simplified schematic illustration of a 2 by 2 optical switch 30 in accordance with the present invention. The switch 30 includes first and second partial optical circulators 32, 34 of the type set forth above. Positioned between the first and second circulators is a fiber Bragg grating 36. There is a switch controller 38 which selects the state of the fiber Bragg grating in dependence on the desired routing of the beams. If the fiber Bragg grating is set to the reflective state, then a first optical beam 40 is routed out exit port 42 of the first circulator, while a second optical beam 44 is routed out an exit port 46 of the second optical circulator. When the fiber Bragg grating is set to the transmissive state, then the first optical beam 40 is routed out exit port 46 of the second circulator, while the second optical beam 44 is routed out exit port 42 of the first optical circulator.

Figure 5:
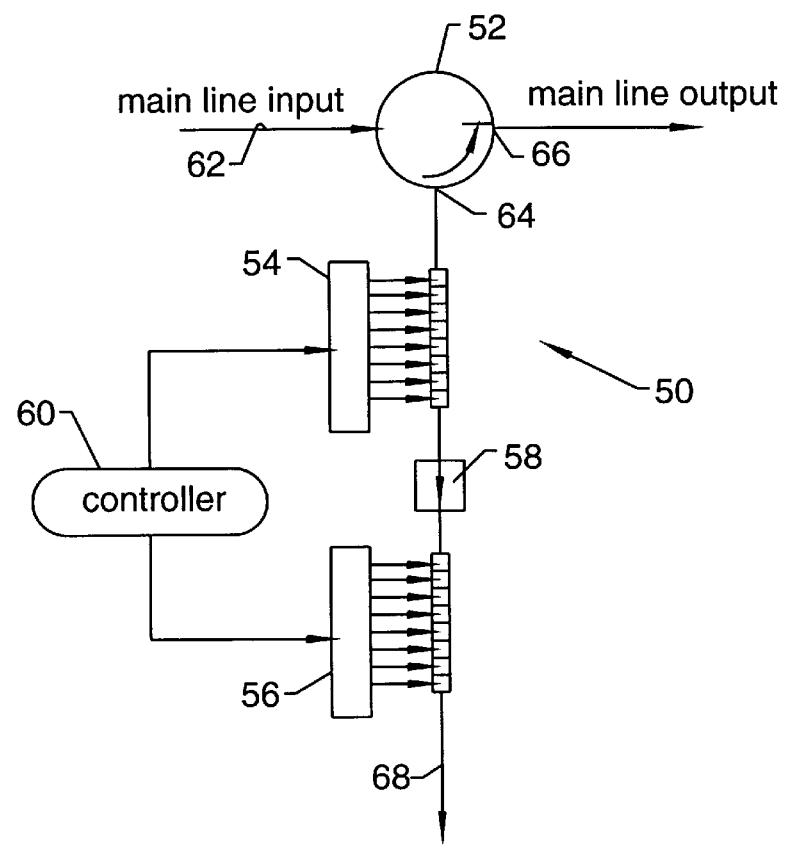
FIG. 5 is a graphical representation of an optical switch provided by the present invention having enhanced channel separation.

FIG. 5 is a simplified schematic illustration of another embodiment of an optical switch provided in accordance with the present invention that is characterized by reduced channel cross talk. The optical switch 50 includes a first partial optical circulator 52 of the type set forth above. There are two fiber Bragg gratings 54, 56 which are positioned to receive a beam provided by the partial optical circulator 52. An optical isolator 58 is positioned between the two fiber Bragg gratings. There is also a switch controller 60 which selects the state of the fiber Bragg gratings in dependence on the desired routing of the beam.

The operation of the optical switch 50 is similar to the optical switch detailed hereinabove with respect to FIG. 3. An input optical beam 62 is received at an input port of the optical circulator 52. The state of the switch is selected by the switch controller 60 to present the input optical beam at either output 64 or 66 by configuring the state of the fiber Bragg gratings. For example, if the input optical beam is to be passed to the output 66, the fiber Bragg gratings are set to be reflective of the signal channels, while the fiber Bragg gratings are set to be transmissive if the optical beam is to be presented on line 68.

The embodiment of the present invention detailed with respect to FIG. 5, provides enhanced channel separation by minimizing signal cross talk. The fiber Bragg gratings receive the beam from output 64 and then present any reflected beam to the next circulator output 66. With the presence of the fiber Bragg grating 56 and optical isolator 58, any signal which has leaked past the fiber Bragg grating 54 in that optical circulator will be reflected back to the optical isolator 58 to be trapped therein. Signal separation in excess of 60$d$B can be readily obtained with the present invention.

Those skilled in the art will note that the substantial gains in signal to noise ratio can be achieved with minimal addition of hardware and nominal changes to the program of the switch controller. Simply adding additional fiber Bragg gratings in series does not achieve the same benefits of the present invention since the combination of the additional fiber Bragg grating and optical isolator effectively traps any signal that may have leaked into the adjacent channel.

Note that in certain embodiments individual signal channels may be individually presented to different outputs since each fiber Bragg grating comprises individually addressable gratings corresponding to each of the signal channels. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

I claim:

1. An add/drop apparatus for selecting component signals of a multi-wavelength optical beam transiting an optical network in which each component signal has an amplitude and a unique wavelength; the apparatus comprising:

a circulator means for receiving said optical beam at an entry port and combining said optical beam with a supplemental optical beam received at a second port for presenting an augmented optical beam to an exit port;

an array of fiber Bragg gratings in communication with said circulator means second port, each of said fiber Bragg gratings tuned to a respective one of said component signal wavelengths, said plurality of fiber Bragg gratings for presenting, in response to control signals, a selected one of said component signals to said supplemental optical beam; and a controller for generating said optical control signals to switch selected ones of said fiber Bragg gratings between transmissive and reflective states.

2. The add/drop apparatus of claim 1 wherein said controller provides optical control signals to switch all of said fiber Bragg gratings to be in either transmissive and reflective states;

a circulator means for receiving said first input optical signal at an entry port and combining said optical beam with a supplemental optical beam received at a second port for presenting an augmented optical beam to an exit port;

a fiber Bragg grating receiving said second optical signal and presenting selected component signals to said circulator means second port in response to optical control signals.

3. A 2×2 optical switch for providing first and second optical output signals from either a first or second input optical signals, with each of said optical signals having component signals with an amplitude and a unique wavelength; said optical switch comprising:

a first circulator means for receiving said first input optical beam at an entry port and for presenting a first output optical beam to first and second first circulator exit ports;

a second circulator means for receiving said second input optical beam at an entry port and for presenting a second output optical beam to first and second circulator exit ports;

an array of fiber Bragg grating for reflecting or transmitting said first and second optical signals in response to optical control signals; and a controller for generating said optical control signals to switch said fiber Bragg grating array between transmissive and reflective states.

4. An optical switch providing enhanced signal channel separation, of component signals of a multi-wavelength optical beam transiting an optical network in which each component signal has an amplitude and a unique wavelength; the switch comprising:

an optical circulator means for receiving said optical beam at an optical circulator first port and combining said optical beam with a supplemental optical beam received at anticipated circulator means second port and for presenting an augmented optical beam to a circulator means exit port;

a first array of fiber Bragg gratings positioned in optical communication with said optical circulator second port, for reflecting or transmitting said optical beam in response to optical control signals;

an optical isolator for transmitting an optical signal presented from said first fiber Bragg grating to an optical isolator inlet port, and for reflecting an optical signal received at an optical isolator exit port;

a second array of fiber Bragg gratings for reflecting or transmitting an optical beam received from said optical isolator exit port in response to optical control signals; and a controller for generating said optical control signals to switch selected ones of said fiber Bragg gratings between transmissive and reflective states.

5. The optical switch of claim 4 wherein said optical circulator means further comprises a plurality of ports each receiving a corresponding supplemental optical beam.

6. An optical network having a main line and a branch line, said optical network comprising:

a plurality of optical signal generators each providing an optical beam having a unique amplitude and wavelength;

a multiplexing means for receiving said optical beams and for providing to said main line a multi-wavelength optical beam with a plurality of component signals each of which corresponds to one of said optical beams;

an optical amplifier for receiving and providing amplification to said multi wavelength optical beam;

an add/drop apparatus for receiving said multi-wavelength optical beam and selectively communicating a one of said component signals with said branch line, said add/drop apparatus including;

a circulator means for receiving said optical beam at an entry port and combining said optical beam with a supplemental optical beam received at a second port for presenting an augmented optical beam to an exit port;

an array of fiber Bragg gratings in communication with said circulator means second port, each of said fiber Bragg gratings tuned to a respective one of said component signal wavelengths, said plurality of fiber Bragg gratings for presenting, in response to control signals, a selected one of said component signals to said supplemental optical beam; and a controller for generating said optical control signals to switch selected ones of said fiber Bragg gratings between transmissive and reflective states;

a demultiplexing means for receiving and demultiplexing said multi-wavelength optical beam into said plurality of component signals;

a detector array having a plurality of photodetectors for receiving said component signal beams and for providing a corresponding electrical feedback signal for each of the component signals indicative of the magnitude of the output power of the component signal.

* * * * *